United States Patent
Ignatchenko et al.

(10) Patent No.: US 9,848,207 B2
(45) Date of Patent: Dec. 19, 2017

(54) EFFICIENT SCREEN IMAGE TRANSFER

(71) Applicants: Sergey Ignatchenko, Innsbruck (AT); Dmitri Ligoum, Aurora (CA)

(72) Inventors: Sergey Ignatchenko, Innsbruck (AT); Dmitri Ligoum, Aurora (CA)

(73) Assignee: OLogN Technologies AG, Liechtenstein (LI)

( * ) Notice: Subject to any disclaimer, the term of this patent is extended or adjusted under 35 U.S.C. 154(b) by 0 days.

(21) Appl. No.: 14/991,902

(22) Filed: Jan. 8, 2016

(65) Prior Publication Data

US 2016/0127745 A1 May 5, 2016

Related U.S. Application Data

(62) Division of application No. 13/800,819, filed on Mar. 13, 2013, now Pat. No. 9,235,905.

(51) Int. Cl.
| | |
|---|---|
| *H04N 19/65* | (2014.01) |
| *G06T 9/00* | (2006.01) |
| *G06F 3/14* | (2006.01) |
| *H04L 12/861* | (2013.01) |
| *H04L 29/08* | (2006.01) |

(52) U.S. Cl.
CPC ........... *H04N 19/65* (2014.11); *G06F 3/1454* (2013.01); *G06T 9/00* (2013.01); *H04L 49/90* (2013.01); *H04L 67/10* (2013.01); *G09G 2340/02* (2013.01); *G09G 2350/00* (2013.01)

(58) Field of Classification Search
CPC .. G09G 2340/02; G09G 5/14; G09G 2340/12; G09G 2340/125; G09G 5/393; G09G 5/395; G09G 2350/00; G09G 2310/04; G09G 2360/18; G09G 2370/12; G09G 2370/16; G09G 5/006; G06T 9/00; H04N 11/042
See application file for complete search history.

(56) References Cited

U.S. PATENT DOCUMENTS

| | | | |
|---|---|---|---|
| 5,179,651 | A | 1/1993 | Taaffe et al. |
| 5,447,153 | A | 9/1995 | Weil et al. |
| 5,961,571 | A | 10/1999 | Gorr et al. |

(Continued)

FOREIGN PATENT DOCUMENTS

WO 2009130930 A1 10/2009

OTHER PUBLICATIONS

Office Action issued in Canadian Patent Application No. 2,907,992, dated Apr. 21, 2016 (6 pages).

(Continued)

*Primary Examiner* — Jingge Wu
(74) *Attorney, Agent, or Firm* — Osha Liang LLP

(57) ABSTRACT

A system including a source display, externally updatable, an image compression algorithm database, a network connection, and a frame transfer engine. The algorithm database comprises a plurality of image compression algorithms. The frame transfer engine is configured to receive a plurality of updates made to the source display, store at least some of the updates in a queue, and select, based on a bandwidth of the network connection, a size of the update, and sizes and times of updates currently present in the queue, an image compression algorithm in the algorithm database for current transfer over the network connection.

16 Claims, 9 Drawing Sheets

(56) References Cited

U.S. PATENT DOCUMENTS

| | | | |
|---|---|---|---|
| 6,104,417 A | 8/2000 | Nielsen et al. | |
| 6,311,126 B1 | 10/2001 | Katayama et al. | |
| 6,389,507 B1 | 5/2002 | Sherman | |
| 6,658,019 B1* | 12/2003 | Chen | H04L 1/1887 370/329 |
| 6,795,583 B1 | 9/2004 | Barnes et al. | |
| 7,145,966 B2* | 12/2006 | Lai | H04L 27/22 375/227 |
| 7,170,518 B1 | 1/2007 | Millington et al. | |
| 7,616,664 B2 | 11/2009 | Wakid | |
| 7,730,157 B2 | 6/2010 | Baratto et al. | |
| 8,068,897 B1 | 11/2011 | Gazdzinski | |
| 8,144,159 B2 | 3/2012 | Brunner et al. | |
| 8,300,708 B2* | 10/2012 | Lamy-Bergot | H04N 21/2383 375/240.02 |
| 8,560,753 B1 | 10/2013 | Hobbs et al. | |
| 2002/0057850 A1 | 5/2002 | Sirohey et al. | |
| 2002/0114296 A1* | 8/2002 | Hardy | H04L 12/2602 370/332 |
| 2002/0144209 A1* | 10/2002 | Ariel | H03M 13/27 714/792 |
| 2002/0146074 A1* | 10/2002 | Ariel | H03M 13/27 375/240.27 |
| 2002/0157058 A1* | 10/2002 | Ariel | H03M 13/27 714/774 |
| 2003/0103523 A1* | 6/2003 | Frossard | H04N 7/52 370/465 |
| 2004/0013252 A1 | 1/2004 | Craner | |
| 2005/0047333 A1* | 3/2005 | Todd | H04L 12/2602 370/229 |
| 2006/0203007 A1 | 9/2006 | Bullard et al. | |
| 2008/0183808 A1 | 7/2008 | Salesky et al. | |
| 2008/0235695 A1 | 9/2008 | Itou | |
| 2009/0119365 A1 | 5/2009 | Tomic | |
| 2009/0273543 A1 | 11/2009 | McVinney | |
| 2009/0304070 A1* | 12/2009 | Lamy-Bergot | H04N 21/2383 375/240.02 |
| 2010/0111410 A1 | 5/2010 | Lu et al. | |
| 2010/0123732 A1 | 5/2010 | Jenks et al. | |
| 2010/0223396 A1 | 9/2010 | Bhootada et al. | |
| 2010/0271381 A1 | 10/2010 | Byford et al. | |
| 2011/0041085 A1 | 2/2011 | Hardebeck et al. | |
| 2011/0115800 A1 | 5/2011 | Desai | |
| 2012/0173662 A1 | 7/2012 | Hickey et al. | |
| 2013/0070093 A1 | 3/2013 | Rivera et al. | |
| 2014/0139537 A1 | 5/2014 | Ghosh et al. | |

OTHER PUBLICATIONS

International Search Report issued in PCT/EP2014/054575 dated Sep. 29, 2014 (7 pages).
Written Opinion issued in PCT/EP2014/054575 dated Sep. 29, 2014 (14 pages).
Christiansen, B.O., "Fast Motion Detaction for Thin Client Compression", Data Compression Conference, Aug. 7, 2002.
Acosta, E., "Real-time Interactions and Synchronization of Voxel-based Collaborative Virtual Environments", IEEE Symposium, Mar. 10-11, 2007.
English Machine Transmittal of WO2009130930 published Oct. 29, 2009 (48 pages).

* cited by examiner

EFFICIENT SCREEN IMAGE TRANSFER

CROSS-REFERENCE TO RELATED APPLICATIONS

This application is a divisional application of U.S. patent application Ser. No. 13/800,819, filed on Mar. 13, 2013, and entitled: "EFFICIENT SCREEN IMAGE TRANSFER." This application claims benefit of U.S. patent application Ser. No. 13/800,819 under 35 U.S.C. §120. U.S. patent application Ser. No. 13/800,819 is hereby incorporated by reference in its entirety.

BACKGROUND

The task of showing the desktop and/or applications of an operating system on an external device is a very common one. Communications channel bandwidth is often limited, and may not have enough capacity for transferring data in real time using lossless compression methods.

There are several different approaches to this problem of data transfer over limited bandwidth. Among these, one of the first was the X Window System (X11). While efficient traffic-wise, it was arduous to maintain. Other protocols have been developed by Citrix, which eventually resulted in Remote Desktop Protocol (RDP). More recently, a simplified protocol called Virtual Network Computing (VNC) was developed. Both RDP and VNC are essentially bitmap-based thus alleviating the maintenance issues typical with X11. However, both VNC and RDP use lossless compression.

Using lossless compression frequently results in the "frame drop" phenomenon: when video is shown on a remote desktop, it results in the displayed video appearing "jerky." In extreme cases, the frame rate of the resulting video may drop to a single frame every 5-10 seconds. Frequently video shown on source screen and transferred over a network connection or communication channel results in frame drops, which appear unnatural for end-user attempting to observe the transmitted video on an external device. The present invention provides an alternative way to fit a stream of updates onto the limited communication channel, aiming to keep the frame rate consistent across both the local display and the remote display, while reducing the image quality on the target display in ways less visible to the end-user.

SUMMARY

In general, in one aspect, the invention relates to a system comprising a source display, externally updatable, an algorithm database, a network connection, and a frame transfer engine. The algorithm database comprises a plurality of image compression algorithms. The frame transfer engine executes on a computer processor and is configured to receive a plurality of updates made to the source display, store at least some of the updates in a queue, and select, based on a bandwidth of the network connection, a size of the update, and sizes and times of updates currently present in the queue, an image compression algorithm in the algorithm database for current transfer over the network connection.

In general, in one aspect, the invention relates to a system comprising a client computer system comprising a target display and a server computer system. The server computer system is connected via a network connection to the client computer system. The server computer system comprises a source display and a memory configured to store an algorithm database comprising a plurality of algorithms, a transmission queue, and a frame transfer engine. The frame transfer engine executes on a computer processor and is configured to determine that the transmission queue comprises an untransmitted queue item, wherein the untransmitted queue item comprises a display frame and a timestamp indicating a time at which the frame transfer engine received the display frame; obtain a first image compression algorithm from the algorithm database, process the display frame using the first image compression algorithm to obtain a processed display frame, and transmit the processed display frame to the client computer system via the network connection.

In general, in one aspect, the invention relates to a method for updating a remote display. The method comprises receiving a first display frame of a source display, generating a first queue item comprising the first display frame, generating a first query using the first queue item, and querying an algorithm database with a first query. The method further comprises receiving, in response to the first query, a first algorithm identifier identifying a first image compression algorithm, processing the first display frame using the first image compression algorithm to obtain a processed first display frame, and transmitting the processed first display frame to a target computer system via a network connection.

Other aspects of the invention will be apparent from the following description and the appended claims.

DETAILED DESCRIPTION

Figure 1:
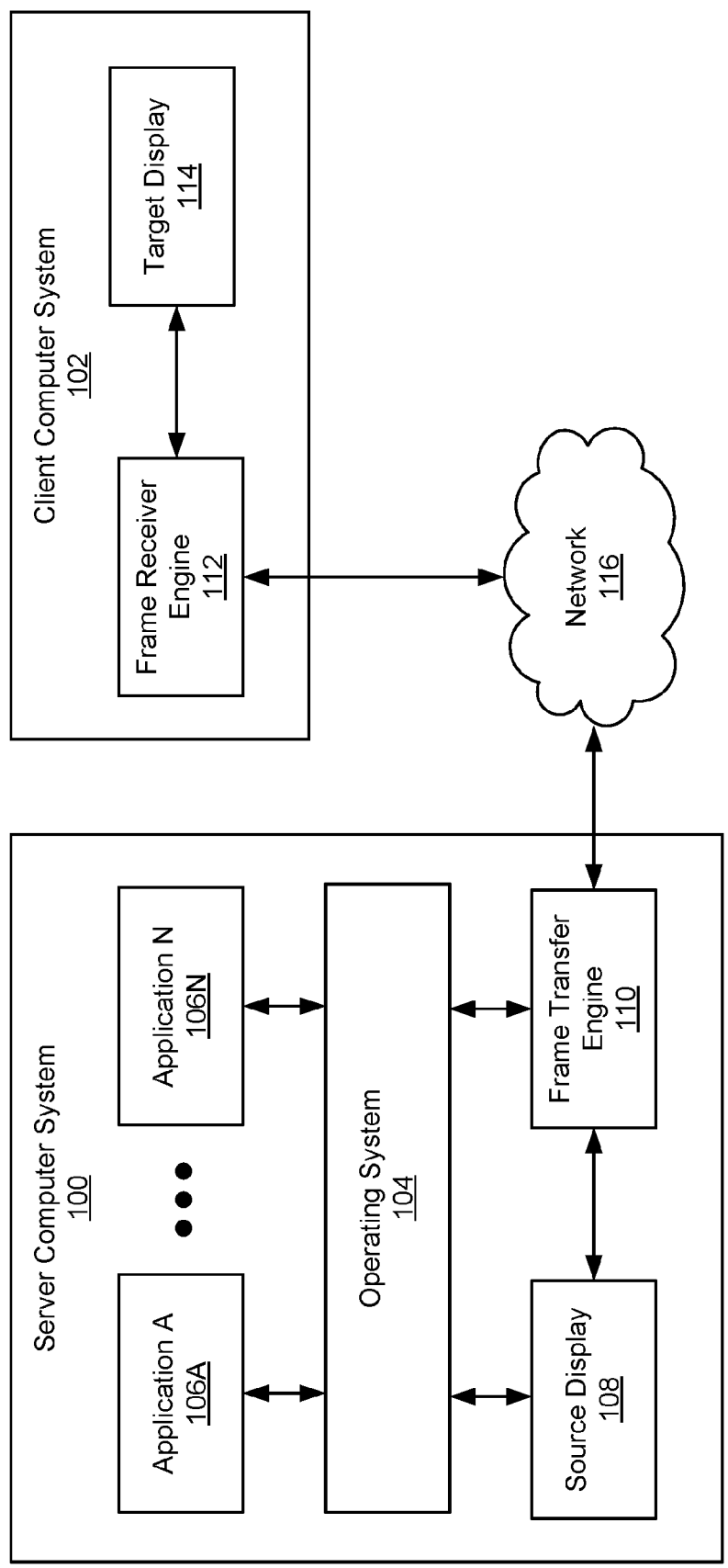
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for transmitting video between computer systems and across a network. In one aspect, embodiments of the invention may be used to send a mirror image of the computer display from one computer to another in such a way as the displays are perceived as being updated simultaneously. Specifically, embodiments of the invention provide a method and system for transmitting frames of a source display over a network when the source display is updated at inconsistent intervals. Embodiments of the invention transmit updates by varying the compression quality while maintaining a minimum frame rate.

For example, in one embodiment of the invention, one user may interact with a software program executing on that user's computer, and a second user can observe the interactions on a second computer, while both the second user and the second computer are in a physically remote location. Each interaction by the first user causes an update to the user's local display, and embodiments of the invention may be used to transmit that update to the second user's computer for display to the second user.

FIG. 1 shows a diagram of a system in accordance with one or more embodiments of the invention. As shown in FIG. 1, the system includes a server computer system (100) and a client computer system (102). The server computer system (100) includes an operating system (104) executing one or more applications (application A (106A), application N (106N)) in accordance with one or more embodiments of the invention. The server computer system (100) also includes a source display (108) used by the operating system to output a visual interface to a display device (not shown) in accordance with one or more embodiments of the invention. The server computer system (100) further includes a frame transfer engine (110). In one or more embodiments of the invention, a client computer system (102) includes a frame receiver engine (112) operatively connected to a target display (114). The frame receiver engine (112) is connected to the frame transfer engine (110) via a network (116) (e.g., a network connection, a communication channel, a network channel, a connection channel, communication link, etc). Each of these elements is described below.

In one or more embodiments of the invention, the server computer system (100) is any computing device with a computer processor configured to execute the frame transfer engine (110). The server computer system (100) may be a desktop computer, a remote server, or a virtual server executing within a virtual machine. Similarly, in one or more embodiments of the invention, the server computer system (100) may be a portable computing system such as a laptop computer, smartphone, tablet computer, or personal digital assistant. In one embodiment of the invention, the server computer system (100) may be a special purpose device, such as a still or video camera, enabled to communicate with the client computer system (102) over the network (116).

In one or more embodiments of the invention, the server computer system (100) communicates with a client computer system (102) over a network (116), such as the Internet. The client computer system (102) may be a desktop computer or a portable computing system such as a laptop computer, smartphone, tablet computer, or personal digital assistant. The client computer system (102) may also be implemented as a special purpose device, such as a television or other type of display device with hardware capable of executing the frame receiver engine (112). Alternatively, in one embodiment of the invention, the client computer system (102) may be a set-top box attached to a display device.

In one or more embodiments of the invention, an operating system (104) is a program or set of programs configured to provide access to resources on the server computer system (100) to applications (application A (106A), application N (106N)). Such resources include hardware resources such as a processor, random access memory, persistent memory, network interface devices, display devices, and input devices such as a keyboard, mouse, or touchscreen.

Continuing with FIG. 1, the operating system (104) provides applications (application A (106A), application N (106N)) the ability to display text or graphics on a display device via the source display (108) in accordance with one or more embodiments of the invention. In one embodiment of the invention, the source display (108) is a combination of hardware and software used to transmit graphical output elements to a display device (not shown). Specifically, the source display (108) may be a set of locations in memory used by the operating system (104) to transmit graphical data to a display device. The source display (108) may include processing logic, such as a graphics processing unit, used to render a display frame for presentation on the display device. In one embodiment of the invention, the source display (108) is integrated into the operating system (104). In one embodiment of the invention, the source display (108) includes the functionality to provide display frames to the frame transfer engine (110). In some embodiments of the invention, the source display (108) may be a "virtual display" without an associated physical device connected to server computer system (100) (e.g., a server without a video card, a smartphone having a low-resolution display and a virtual source display of a much higher resolution).

In one or more embodiments of the invention, the frame transfer engine (110) is a program configured to obtain a series of display frames from the source display (108), and initiate a transfer of the display frames to the frame receiver engine (112). In one or more embodiments of the invention, the frame transfer engine (110) is executed by the operating system (104) in the same or similar manner as other applications (application A (106A), application N (106N)). Alternatively, in one embodiment of the invention, the frame transfer engine (110) operates as part of the operating system (104) (for example, as a series of kernel-level processes). In one embodiment of the invention, frame transfer engine (110) may be implemented in hardware (for example, as an application-specific integrated circuit). Further detail regarding the frame transfer engine (110) is shown in relation to FIG. 2 and described below.

In one or more embodiments of the invention, each display frame captured by the frame transmission engine corresponds to the entire visual display presented to a user of the server computer system. Alternatively, in one embodiment of the invention, each display frame corresponds to a portion of the visual display at which an update was made (e.g., location on a screen where text was added to an electronic document). In one embodiment of the invention, the frame transmission engine captures only the visual display corresponding to a single application (e.g., a single window displayed on an operating system instead of all windows displayed).

In one embodiment of the invention, the display frames are transmitted from the frame transfer engine (110) to the frame receiver engine (112) in a queue items. Further, although FIG. 1 depicts the frame transfer engine (110) to the frame receiver engine (112) as communicating directly via the network (116), in one embodiment of the invention, the queue items (or elements extracted from the queue items) are transmitted using a network stack (not shown) within the operating system (104), and received by a corresponding network stack (not shown) on the client computing system (102). In one embodiment of the invention, the queue items are divided into data packets, and sent to the client computing system (102) using one or more network protocols.

In one or more embodiments of the invention, the network (116) includes any link (such as a communication channel, network connection, network channel, communication link, etc.) between the server computer system (100) and the client computer system (102). In one embodiment of the invention, the network (116) may host different network protocols, and different network protocols may be implemented at different network layers. For example, at the transport layer, such network protocols may include, but are not limited to, transmission control protocol (TCP) and/or user datagram protocol (UDP). In addition, network (116) may be implemented as a link directly between devices, such as a Universal Serial Bus (USB) link, a Bluetooth link (Bluetooth® is a registered trademark of Bluetooth SIG, Inc.), or any other type of device communications protocol.

In one or more embodiments of the invention, the frame receiver engine (112) is a combination of hardware and software executing on the client computer system (102) used to receive and decode the display frames. In one or more embodiments of the invention, the display frames may be received encoded in common graphic formats (such as joint photographic experts group (JPEG) and/or portable network graphics (PNG)), which are subsequently decoded by the frame receiver engine (112).

In one or more embodiments of the invention, the target display (114) is a combination of hardware and software used to present the display frames decoded by the frame receiver engine (112). The target display (114) may include processing logic, such as a graphics processing unit, used to render a display frame for presentation on a display device operatively connected to the client computer system (102). In one embodiment of the invention, the target display (114) is integrated into a client operating system (not shown). In some embodiments of the invention, the target display (114) may be a "virtual display" without an associated physical device connected to client computer system (102) (e.g., a client without a video card, etc.).

Figure 2:
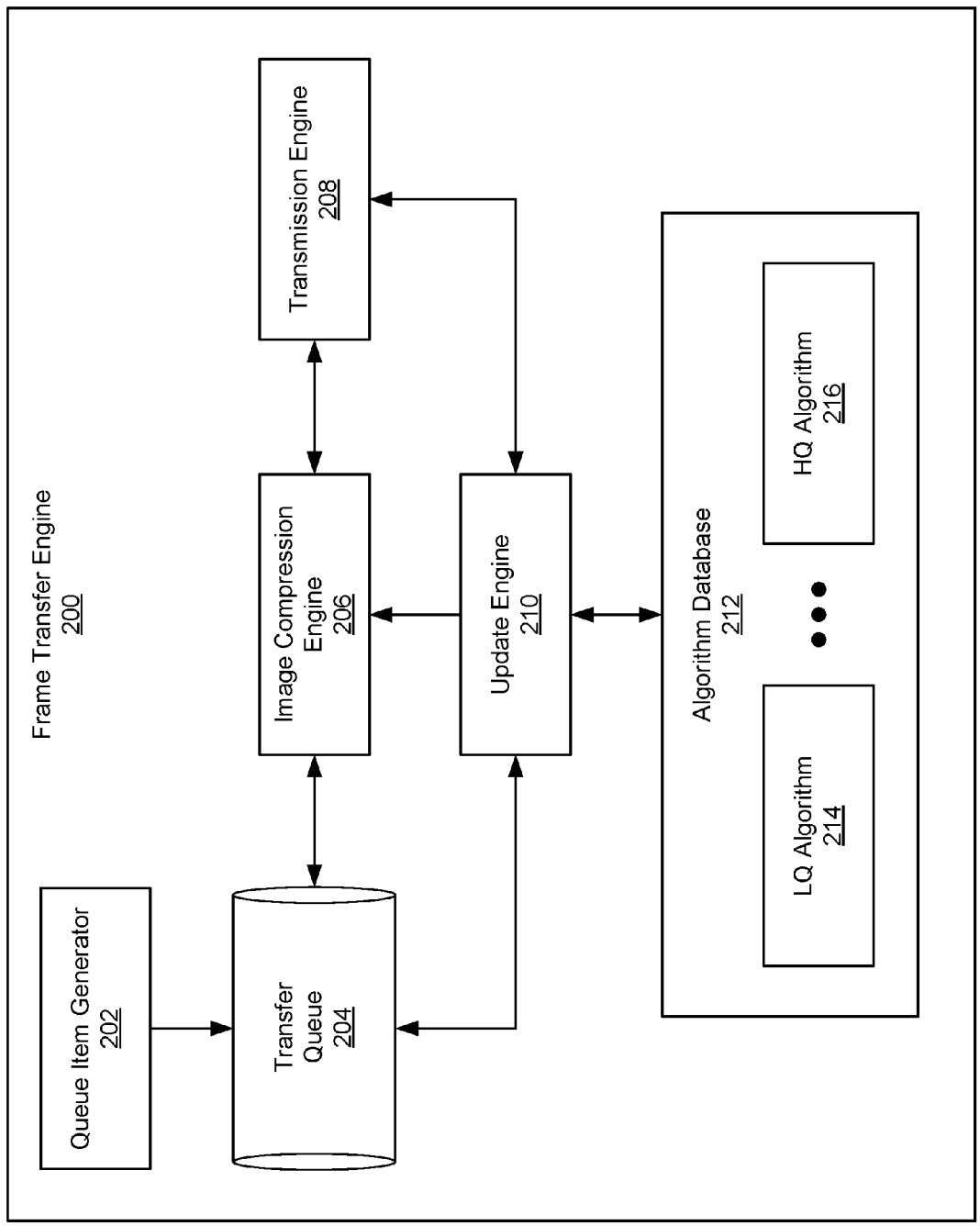
FIG. 2 shows a frame transfer engine in accordance with one or more embodiments of the invention.

FIG. 2 shows a diagram of a frame transfer engine (such as the frame transfer engine (110) in FIG. 1) in accordance with one or more embodiments of the invention. As shown in FIG. 2, the frame transfer engine (200) includes a queue item generator (202), a transfer queue (204), an image compression engine (206), a transmission engine (208), an update engine (210), and an algorithm database (212). The algorithm database (212) stores a range of compression algorithms that includes a lowest quality (LQ) algorithm (214) and a highest quality (HQ) algorithm (216). Each of these elements is described below.

In one or more embodiments of the invention, the queue item generator (202) includes functionality to receive notice that the source display has been updated, and obtain a display frame corresponding to the updated portion of the source display. In one or more embodiments of the invention, the queue item generator (202) generates a queue item that may include the received display frame, a location of the source display to which the display frame corresponds, a timestamp corresponding to the time the queue item generator (202) received the display frame, and a lower quality transfer flag (LQTF) initially set to false. Once generated, the queue items may be merged with the remaining queue items in the transfer queue. More detail regarding the queue items and transfer queue is provided in regard to FIG. 3. In one embodiment of the invention, a queue item is referred to as an update.

Continuing with FIG. 2, the image compression engine (206) is configured to obtain a queue item from the transfer queue (204) and apply a compression algorithm to the display frame to generate a processed queue item in preparation for transfer by the transmission engine (208) in accordance with one or more embodiments of the invention. The image compression engine (206) is notified by the update engine (210) regarding which compression algorithm to apply.

In one embodiment of the invention, the transmission engine (208) is configured to obtain the processed queue items from the image compression engine (206) and initiate a transfer of the processed queue item to a client computer system. In one embodiment of the invention, the transmission engine (208) uses a network interface provided by the operating system to initiate the transfer of the processed queue item. In one embodiment of the invention, the processed queue item is divided into datagrams or packets and transferred across a network link before being reassembled on the client computer system. In one or more embodiments of the invention, the transmission engine (208) provides a recent measurement of the bandwidth (BW) between the server computer system and the client computer system. In one or more embodiments of the invention, the transmission engine (208) is configured to provide an indication to the update engine (210) regarding whether a transfer of a queue item is currently underway.

In one or more embodiments of the invention, the update engine (210) is configured to gather information from the transfer queue (204), image compression engine (206), and the transmission engine (208) to generate a query for the algorithm database (212). In one embodiment of the invention, the update engine (210) obtains a display frame size (the size of the corresponding display frame in square pixels) and a display frame target size (desired size in bytes of the display frame in the processed queue item). The update engine (210) submits the display frame size and the display frame target size in a query to the algorithm database (212) to obtain an identifier of a compression algorithm which may be applied to the display frame in order to produce a processed display frame that is a substantially similar size to the submitted display frame size target.

Continuing with FIG. 2, the algorithm database (212) is a collection of searchable algorithm identifiers each associated with an algorithm, in accordance with one or more embodiments of the invention. Each algorithm is associated with a typical compression ratio which allows the image compression engine (206) to calculate the display frame target size in bytes based on the display frame size in square pixels. The algorithm identifier corresponding to the algorithm with the lowest compression ratio is the highest quality (HQ) algorithm (216). In one embodiment of the invention, the HQ algorithm uses lossless compression (such as PNG). In one or more embodiments of the invention, HQ algorithm (216) can be without compression. The algorithm identifier corresponding to the algorithm with the highest compression ratio is the lowest quality (LQ) algorithm (214). Upon evaluating a query that would require a compression ratio higher than that of the LQ algorithm (214), the algorithm database may be configured to respond with an algorithm identifier indicating "no algorithm" or "null." It should be noted that in some embodiments of the invention, the algorithm database (212) may try using actual algorithms with actual pixel data to calculate the optimal algorithm, instead of using typical compression ratios. It should further be noted that algorithm database (212) can be implemented in many ways including, but not limited to, a list of algorithms embedded into the source code of a program or a collection of files.

In one or more embodiments of the invention, each compression algorithm may correspond to a conversion process for transforming the display frame from its initial format (which may be similar to a plain uncompressed red-green-blue (RGB) bitmap format) into a different or altered format. In one or more embodiments of the invention, display frames are processed into lossless formats (i.e., highest quality) or lossy formats (i.e., lower quality). Further, different types of lossy compression processes result in varying levels of resulting quality. A high quality lossy compression may result in a graphic image nearly visually indistinguishable from the same image processed using a lossless compression process. In addition, graphics processed using lossless compression are generally larger than the same graphics processed using a lossy compression. Similarly, graphics processed using a higher quality lossy compression are generally larger than the same graphics processed using a lower quality lossy compression. Examples of different lossless and lossy compression processing algorithms include, but are not limited to, discrete cosine transform (DCT), Fourier transform, and various algorithms based on Lempel-Ziv (LZ), such as LZ77, Huffman and/or arithmetic encodings, or any combination of these algorithms. Resulting image types include, but are not limited to, bitmap images, PNG images, and JPEG images.

In one or more embodiments of the invention, the display frame size target may be calculated using the most recent measurement of the BW and the maximum amount of time allotted for the transfer. For example, a query targeting the algorithm database (212) may include a display frame size of X square pixels, and a display frame size target of Y kilobytes (kBytes). Alternatively, the query may instead include a display frame size of X square pixels, and a display frame target size equal to the current BW times the time available to transfer. As another example, a query targeting the algorithm database (212) may include a display frame size of 20,000 square pixels (which corresponds to 100×200 pixels), and a display frame size target equal to the number of bytes that may be transferred over a connection with a BW of 1 kilobytes/second during a target time period of 5 seconds, which would be 5 kBytes.

Figure 3:
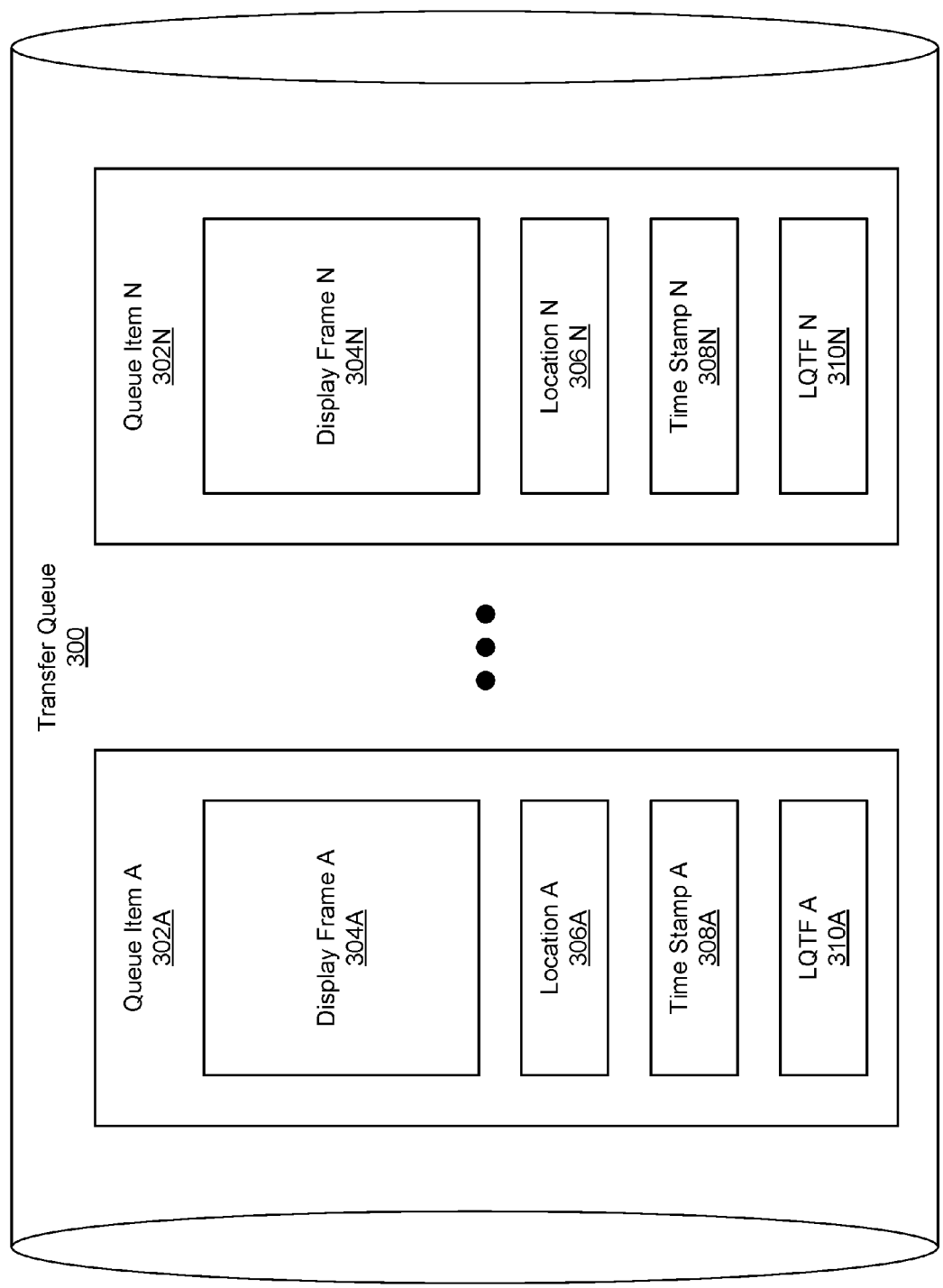
FIG. 3 shows a transfer queue in accordance with one or more embodiments of the invention.

FIG. 3 shows a diagram of a transfer queue (such as transfer queue (204) in FIG. 2) in accordance with one or more embodiments of the invention. As shown in FIG. 3, a transfer queue (300) includes a number of queue items (queue item A (302A), queue item N (302N)). Each queue item (queue item A (302A), queue item N (302N)) includes a display frame (display frame A (304A), display frame N (304N)), a location (location A (306A), location N (306N)), a timestamp (timestamp A (308A), timestamp N (308N)), and a lower quality transfer flag (LQTF) (LQTF A (310A), LQTF N (310N)). Each of these elements is described below.

In one or more embodiments of the invention, the display frame (display frame A (304A), display frame N (304N)) corresponds to an image received from the display source by the queue item generator. In one or more embodiments of the invention, the display frame (display frame A (304A), display frame N (304N)) may be a portion of the entire source frame displayed at a given moment in time via the display source. For example, a display frame (display frame A (304A), display frame N (304N)) may be an image 100 pixels wide and 200 pixels tall corresponding to the lower left corner of the entire source frame. In one or more embodiments of the invention, the display frame (display frame A (304A), display frame N (304N)) corresponds to the portion of the entire source frame where a change in the source frame has occurred. For example, the display frame (display frame A (304A), display frame N (304N)) obtained by the queue item generator may correspond to the portion of the screen that displays the time of day, and may have been obtained in response to a detection that the portion of the screen has changed (e.g., because the minute value displayed has just been updated).

In one or more embodiments of the invention, the location (location A (306A), location N (306N)) corresponds to the position of the display frame (display frame A (304A), display frame N (304N)) relative to the entire source display. Referring again to an example display frame that is an image 100 pixels wide and 200 pixels tall corresponding to the lower left corner of the entire source frame, the location (location A (306A), location N (306N)) of that display frame may be the pixel coordinates of the upper-left corner of the entire source display frame. In one or more embodiments of the invention, the location (location A (306A), location N (306N)) may additionally describe the dimensions of the display frame. Further, in one or more embodiments of the invention, the location (location A (306A), location N (306N)) may describe display frame shapes with a complexity greater than that of a regular polygon (e.g., combinations of areas).

In one embodiment of the invention, the timestamp (timestamp A (308A), timestamp N (308N)) corresponds to the time or clock value at the point the display frame was received. In one or more embodiments of the invention, the age of the display frame may be calculated by subtracting the current clock value from the timestamp (timestamp A (308A), timestamp N (308N)).

In one embodiment of the invention, the LQTF (LQTF A (310A), LQTF N (310N)) is a Boolean indicator that the display frame associated with the LQTF has previously been transmitted to the client computer system using an algorithm with an output quality less than that of the HQ algorithm. Stated differently, a LQTF equal to true indicates that the associated display frame has been transferred at less-than-full quality. In one or more embodiments of the invention, once a queue item is transferred using the HQ algorithm, then the queue item is removed from the transfer queue (300). Alternatively, once a queue item is transferred using an algorithm that is less than the HQ algorithm, the LQTF (LQTF A (310A), LQTF N (310N)) is changed from false to true, and the queue item will either be eventually merged with other queue items, or subsequently be transferred using the HQ algorithm and removed from the transfer queue (300).

In one embodiment of the invention, new queue items are added to the transfer queue (300) using a merging process. In one or more embodiments of the invention, queue items are merged with existing queue items in the transfer queue (300) in a variety of ways. For example, depending upon the circumstances (discussed below) a current queue item is merged with (i) only the queue items that have a LQTF equal to false, (ii) only the queue items that have a LQTF equal to true, or (iii) all other queue items in the transfer queue that have a LQTF equal to false, with a timestamp within a set period of the timestamp of the current queue item.

Further, in one or more embodiments of the invention, the merging process results in the elimination or trimming of overlapping areas of the display frame. Depending upon the circumstances (also discussed below) merging a current queue item with existing queue items results in the trimming of the overlapping areas of the existing queue items. Alternatively, merging a current queue item with existing queue items results in the trimming of the overlapping areas of the current queue item. In some circumstances, merging display frames that completely overlap each other results in the elimination of the queue item targeted for trimming. For the purposes of this application, a merge operation in which a current queue item is merged with all existing queue items with a LQTF equal to false, where the current queue item is targeted for trimming, is referred to as merge[LQTF=false/trim current]. A merge operation in which a current queue item is merged with all existing queue items regardless of LQTF value, where the existing queue items are targeted for trimming, is referred to as merge[LQTF=any/trim existing].

Figure 4:
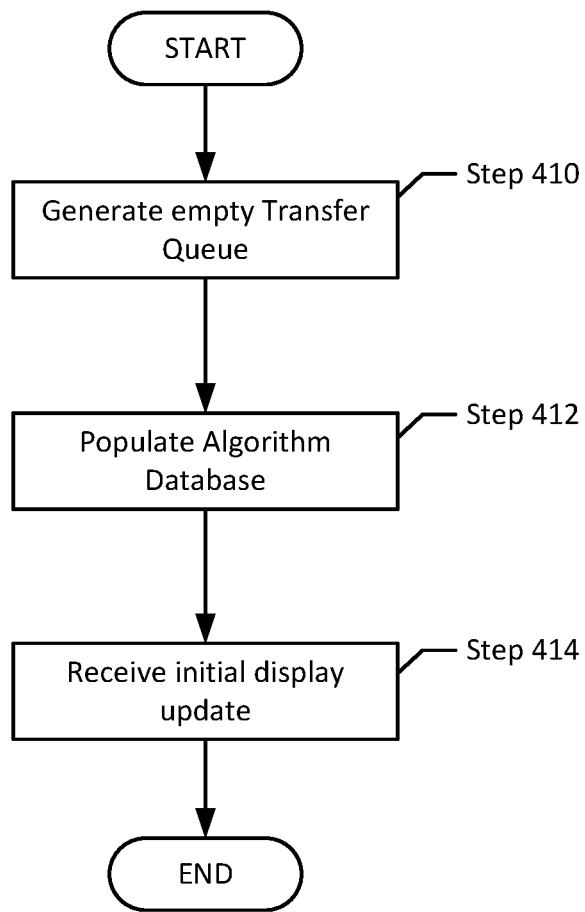
FIG. 4 shows a flow chart in accordance with one or more embodiments of the invention.

FIG. 4 shows a flowchart for initializing a frame transfer engine in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 410, an empty transfer queue is generated. In Step 412, the algorithm database is populated with algorithm identifiers corresponding to the available compression algorithms. In one or more embodiments of the invention, if algorithm database is hardcoded then the algorithm database need not be populated. In Step 414, the queue item generator receives an initial display frame from the source display.

Figure 5:
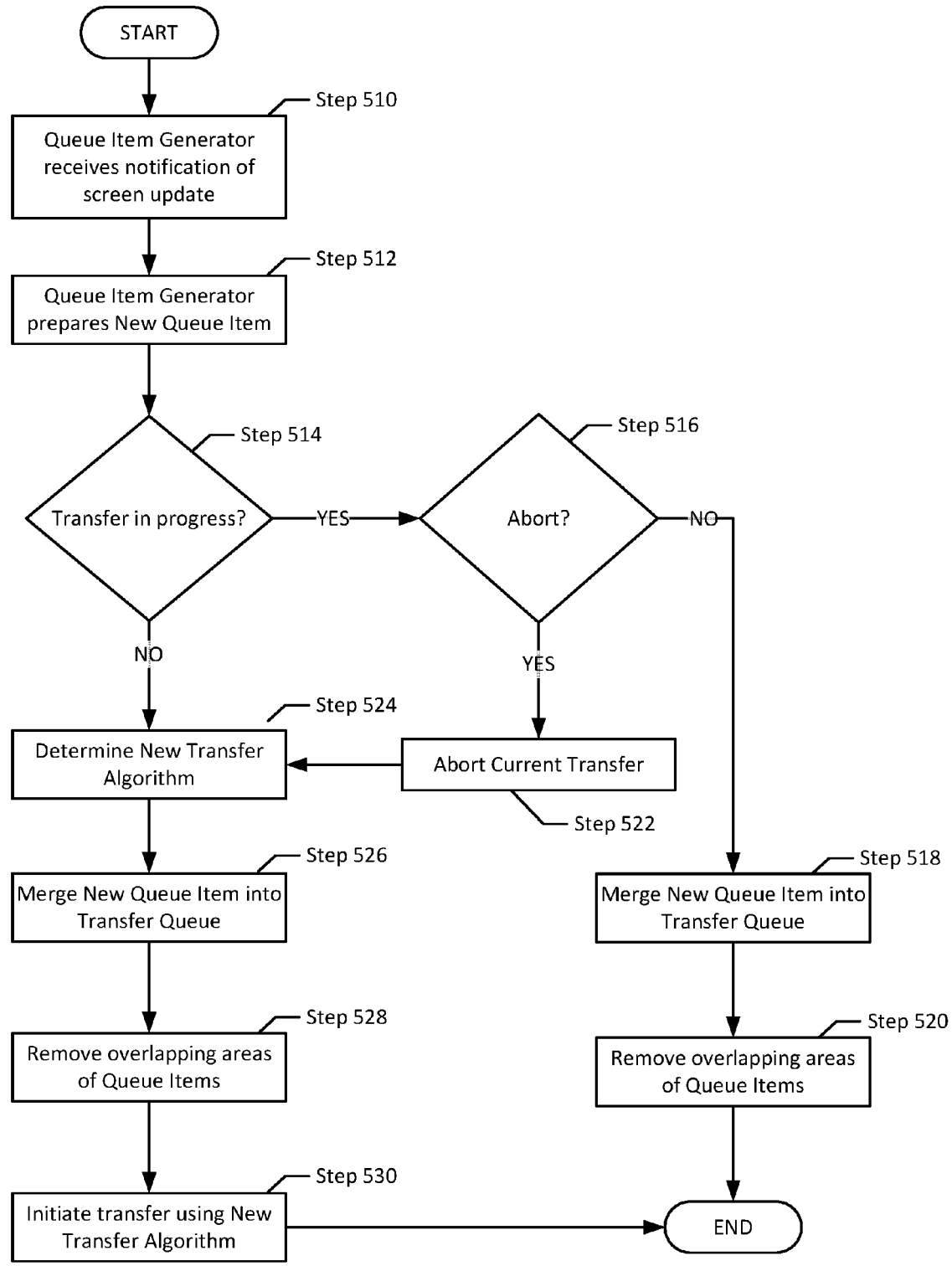
FIG. 5 shows a flow chart in accordance with one or more embodiments of the invention.

FIG. 5 shows a flowchart receiving a new display frame in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 510, the queue item generator receives a notification that the source display has been updated. Next, the queue item generator receives a display frame and generates a new queue item using the received display frame (Step 512). In Step 514, the update manager determines whether there is currently a transfer in progress. In one or more embodiments of the invention, the update manager determines whether a transfer is currently in progress by querying the transmission engine.

If in Step 514, a determination is made (typically by the update engine) that a current transfer underway, then, in Step 516, a determination is made (typically by the update engine) whether to abort the current transfer. In one or more embodiments of the invention, the determination regarding whether to abort the current transfer requires a determination as to whether the queue items in the transfer queue may be transmitted at a rate no less than a set minimum frequency. Stated differently, the update engine determines whether at least one update will be received within a set period of time from when the update occurred. The set period of time is referred to as the guarantee time (Tguar). A transfer rate at which at least one update will be received within the Tguar is referred to as satisfying the "soft guarantee" of the Tguar.

In one or more embodiments of the invention, whether Tguar may be maintained at the current transfer rate is determined by calculating an abort algorithm and a continue algorithm. The continue algorithm is obtained from a query generated for transferring the update display frame and all other frames in the transfer queue in the time remaining after the current transfer has completed. In other words, the update engine determines whether Tguar can be maintained for the update display frame if the transfer of the update display frame does not begin until the current transfer finishes.

The abort algorithm is calculated as the lower quality algorithm between two query responses. The first abort algorithm is the algorithm for transferring the update display frame and all other frames in the transfer queue within Tguar from the current time, if the transfer were to begin immediately. In other words, the update engine determines whether Tguar can be maintained for all the existing updates if the current transfer is abandoned, and the update display frame is merged with the transfer queue and the transfer is restarted. The second abort algorithm is the algorithm for transferring the update display frame within the time left from original Tguar for the current transfer. In other words, the update engine determines whether Tguar can be maintained for the current transfer if the current transfer is abandoned and restarted. If both of the abort algorithms result in a higher quality compressed image than the continue algorithm, then the update engine aborts the current transfer.

If the current transfer is not aborted, then in Step 518, the new queue item is added to the transfer queue using merge [LQTF=any/trim existing]. In Step 520, as a result of the merge operation, older queue items that have been previously transmitted (i.e., LQTF is true) and have been overwritten by more recent updates are reduced in size or eliminated completely.

If, in Step 516, a determination is made that transfer should be aborted, then in Step 522, the current transfer is aborted. The transfer may be aborted, for example, if large portions of the source display are being updated.

If there is no transfer in progress in Step 514, or if the transfer has been aborted in Step 522, then the update engine queries the algorithm database using the current BW, and a time period of Tguar (Step 524). At Step 526, the new queue item is merged with the transfer queue using merge [LQTF=any/trim existing]. As a result of the merge operation, older queue items that have been previously transmitted and have been overwritten by more recent updates are reduced in size or eliminated completely (Step 528). In Step 530, the transfer of the new queue item is initiated using the new algorithm.

Figure 6:
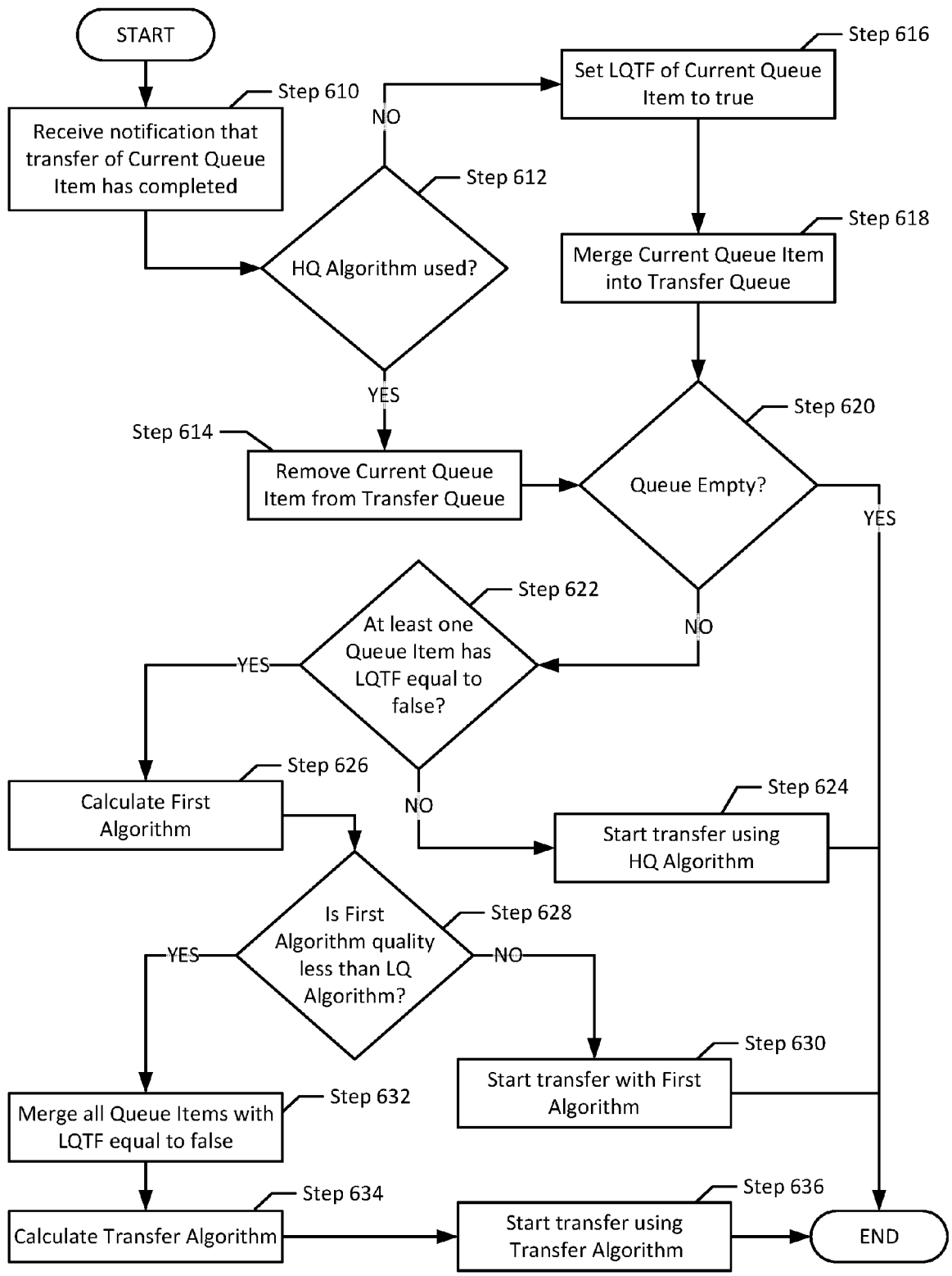
FIG. 6 shows a flow chart in accordance with one or more embodiments of the invention.

FIG. 6 shows a flowchart for determining the next queue item to be sent in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In one or more embodiments, notification is received (typically by the update engine) that a transfer of a queue item has completed (Step 610). In Step 612, a determination is made (typically by the update engine) whether the completed transfer was performed using the HQ algorithm. If in Step 612, a determination is made that the HQ algorithm was used, then the current queue item that has just completed transmission to the client computer system is removed from the transmission queue. The queue item is removed because the target screen has already been updated with the highest quality display frame, and any further updates of that portion of the target display that do not represent updates to the source display (but rather only improvements to the clarity or sharpness of the image) are unnecessary.

If, at Step 612, a determination is made (typically by the update engine) that the HQ algorithm was not used, then in Step 616, the LQTF of the current queue item is set to true.

In one or more embodiments of the invention, setting the LQTF to true indicates that a lower quality version of the display frame has already been sent to the client computing device, and the display frame may be resent at a higher quality if resources allow (and thus clarifying or sharpening the corresponding portion of the target display).

At Step 618, the current item is merged into the transfer queue using merge[LQTF=false/trim current]. As a result, any area of the display frame in the current queue item that overlaps with areas of any display frames in queue items that have not been transferred at all, are removed from the current queue item. In one or more embodiments of the invention, the current queue item may be removed completely if the entire display frame is overlapped by portions of display frames in other queue items yet to be transferred.

At Step 620, the update engine determines whether the queue is empty. If the queue is empty, then no further action is necessary until the source display is updated. If the queue is not empty, then in Step 622, a determination is made whether at least one queue item has a LQTF equal to false (i.e., has not been transmitted to client computer system at all). If no queue item exists with a LQTF equal to false, then at Step 624, the oldest queue item is transferred across a network connection or communication channel using the HQ algorithm. In one or more embodiments of the invention, when the transfer queue contains only queue items with a LQTF equal to true, then all updates to the target display have been transmitted, even if they were transmitted at a low image quality. The remaining queue items are then transferred in order to clarify or sharpen the image shown on the target display.

If in Step 622, a determination is made (typically by the update engine) that at least one queue item has a LQTF equal to false, then the update engine queries the algorithm database to obtain a first algorithm (Step 626). In one or more embodiments of the invention, the first algorithm is used to determine whether the Tguar can be maintained for both the next queue item and all pending queue items in the transfer queue. In one or more embodiments of the invention, the first algorithm is determined by obtaining (i) the algorithm for all non-transferred items in the queue using a display frame target size of the current BW multiplied by Tguar (this ensures that, unless new updates come in, all items together will satisfy Tguar "soft guarantee") and (ii) the algorithm for the first non-transferred item using a display frame target size of the current BW multiplied by the Tguar remaining for the first non-transferred item (this ensures that first item in queue will satisfy Tguar "soft guarantee"). If either of the queries is returned from the algorithm database as no algorithm (i.e., the algorithm to satisfy the query would have a lower quality then LQ algorithm), then the update engine merges all non-transferred items in the queue. Subsequently, the update engine then queries the algorithm database using the resulting merged queue item, the current BW, and the Tguar. The merged queue item would then be transferred across the network connection or communication channel using the resulting algorithm.

If, in Step 628, a determination is made (typically by the update engine) that there exists an algorithm in the algorithm database such that Tguar can be maintained for both the next queue item and all pending queue items in the transfer queue, then the next queue item is transferred across a network connection or communication channel using the lower quality of the two determined algorithms (Step 630).

If a determination is made (typically by the update engine) that either the next queue item or the remaining queue items require an algorithm with a lower resulting quality than the resulting quality of LQ algorithm (Step 628), then the current bandwidth is not sufficient to satisfy Tguar "soft guarantee" at the current rate of updates. In this case, in some embodiments, all queue items in the transfer queue with a LQTF equal to false are merged (Step 632). In Step 634, one or more queries of the algorithm database are made (typically by the update engine) using a display frame size of the next queue item, and a display frame target size as the current BW times the Tguar. In Step 636, the next queue item is transferred across a network connection or communication channel using the algorithm identified from the query result.

Figure 7A:
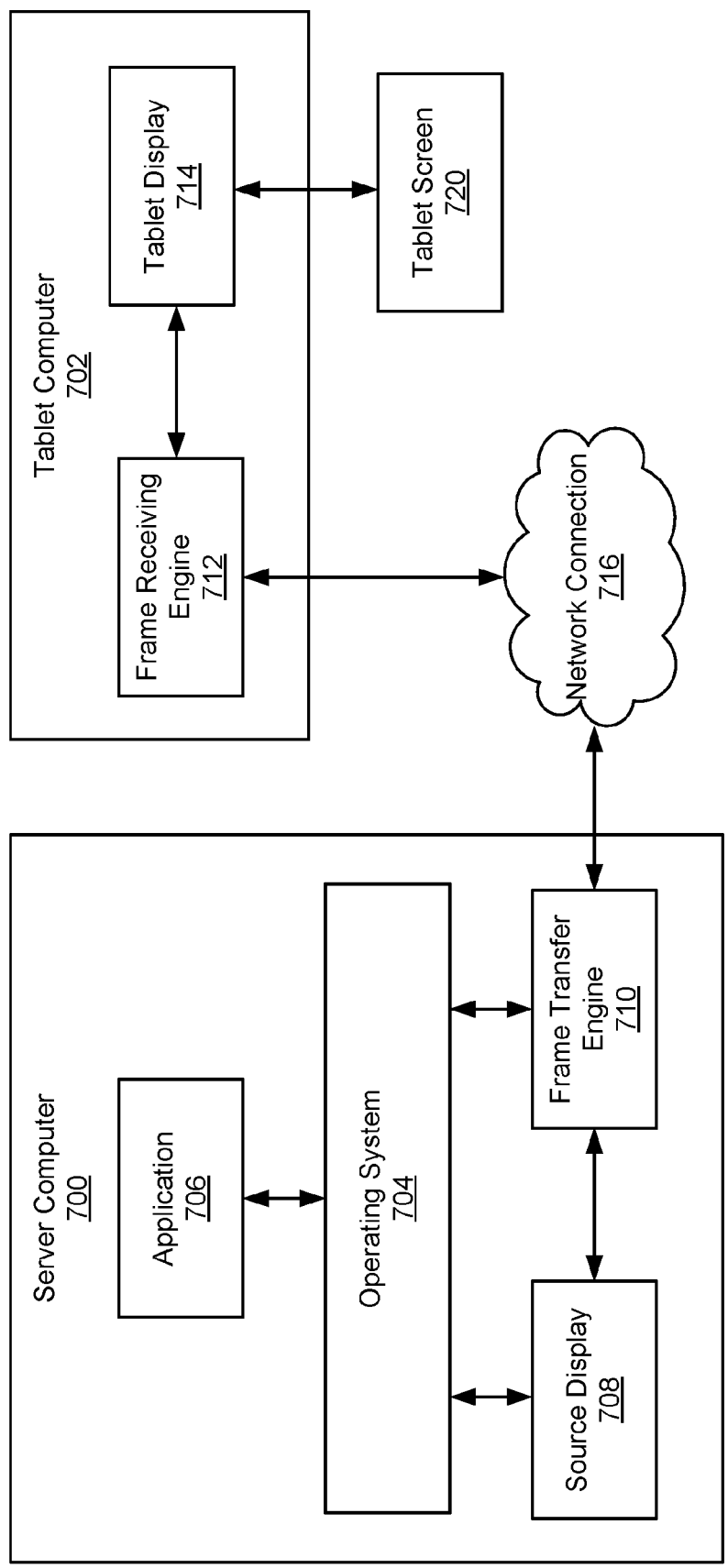
FIG. 7A shows a flow diagram in accordance with one or more embodiments of the invention.

FIG. 7A shows an example in accordance with one or more embodiments of the invention. The example shown in FIG. 7A is for explanatory purposes only and not intended to limit the scope of the invention. In the example depicted in FIG. 7A, the system includes a server computer (700) and a tablet computer (702). The server computer (700) includes an operating system (704) executing application (706). The server computer (700) also includes a source display (708) used by the operating system to output a visual interface to a display device (not shown). The server computer (700) further includes frame transfer engine (710). Tablet (702) includes a frame receiver engine (712) operatively connected to a tablet display (714), which outputs the received video display to a tablet screen (720). The frame receiver engine (712) is connected to the frame transfer engine (710) via a network connection (716), such as a wired or wireless communication link.

Figure 7B:
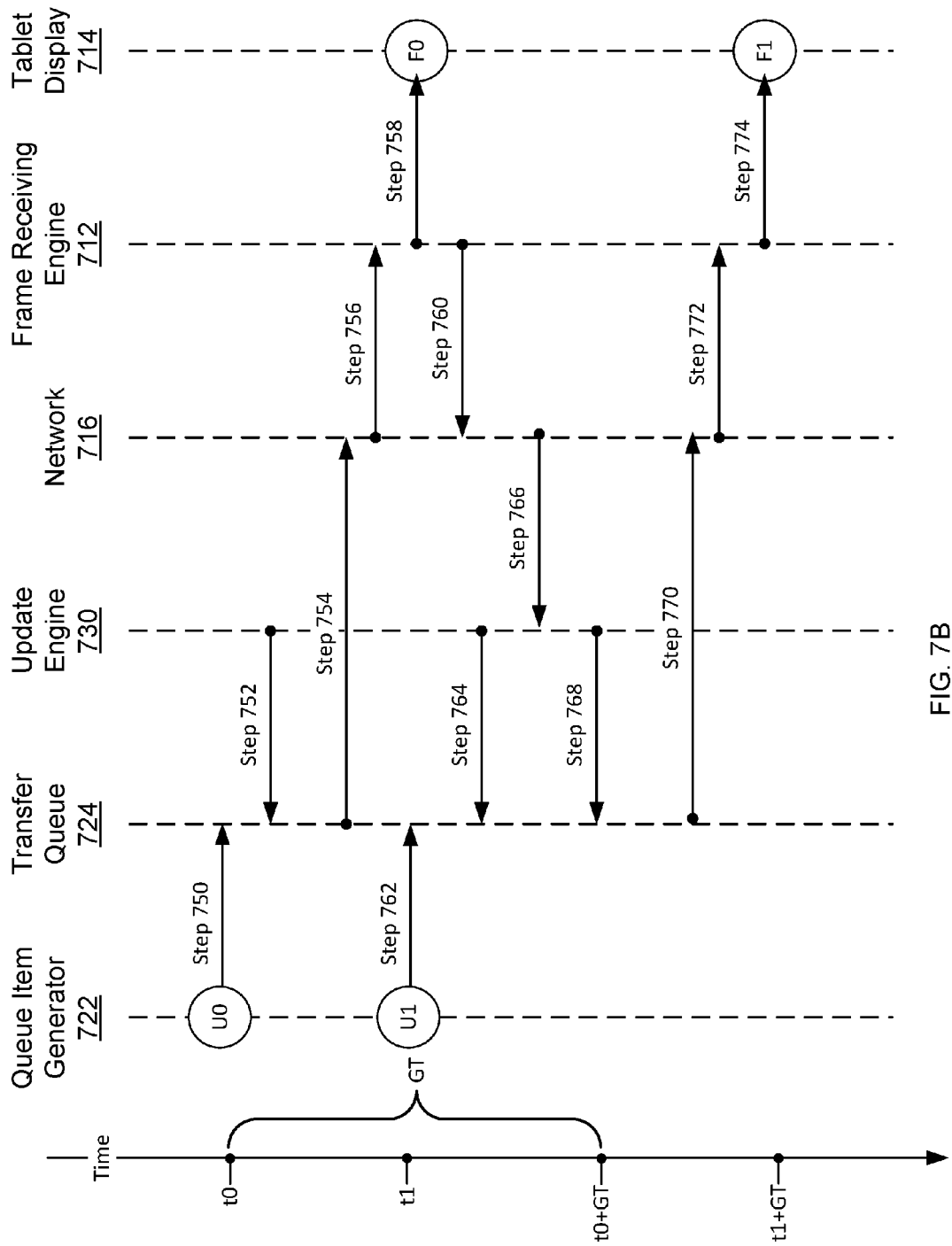
FIG. 7B show an example timeline in accordance with one or more embodiments of the invention.

FIG. 7B shows an example timeline in accordance with one or more embodiments of the invention. The example timeline in FIG. 7B depicts an interaction between the elements depicted in FIG. 7A. The example timeline shown in FIG. 7B is for explanatory purposes only and not intended to limit the scope of the invention.

In Step 750, the queue item generator (722) of the frame transmission engine (710) receives display frame U0 and prepares a queue item for U0. In Step 752, the update engine (730) is notified of the update, and determines whether a transfer is currently in progress. For the purposes of this example, there is no current transfer in progress. The update engine (730) then determines a new transfer algorithm by querying the algorithm database. The update engine 730 obtains the current BW from the transmission engine, and generates a query using the size of U0 and display frame target size calculated as the guarantee time (Tguar) multiplied by the current BW. For the purposes of this example, assume the size of U0 is 20,000 square pixels, the Tguar is 25 milliseconds (ms), and the current BW is 700 kilobits per second (or 0.8 bits per ms). The display frame size target, therefore, is calculated to be 20 kilobits. The algorithm database responds to the query with an algorithm identifier of a JPEG algorithm to convert U0. The update engine (730) configures the image compression engine to use the JPEG algorithm, and initiates the transfer of U0 to the tablet computer (714). A compressed version of U0 is generated resulting in a JPEG with a size of approximately 20 kilobits.

In Step 754, the transmission of the compressed version of U0 across a community channel is initiated. At Step 756, the frame receiving engine (712) on the tablet computer (702) receives the compressed version of U0. In Step 758, the compressed version of U0 is decoded and rendered as F0 by the tablet display (714). In Step 760, the tablet computer (702) sends an acknowledgement across the network connection or communication channel that the transfer has completed.

In Step 762, the queue item generator (722) of the frame transmission engine (710) receives display frame U1 and prepares a queue item for U1. In Step 764, the update engine (730) is notified of the update, and determines whether a transfer is currently in progress. Because the server computer (700) has not yet received an acknowledgement of completion from the tablet computer (702), the update engine (730) determines that a transfer is still in progress.

In Step 764, the update engine (730) determines whether to abort the current transfer. For the purposes of the example, assume that frame transmission engine (710) determines whether to abort the current transfer using a comparison of a continue algorithm and an abort algorithm. The continue algorithm is obtained from a query generated for transferring the update display frame U 1 and all other frames in the transfer queue (except U0) in the time remaining after the current transfer has completed. In other words, the update engine determines whether Tguar can be maintained for U1 if the transfer of U1 does not begin until the current transfer finishes.

The abort algorithm is calculated as the lower quality algorithm between two query responses. The first abort algorithm is the algorithm for transferring the update display frame U1 and all other frames in the transfer queue (including U0) within the Tguar from the current point in time, if the transfer were to begin immediately. In other words, the update engine determines whether Tguar can be maintained for all the existing updates if the current transfer is abandoned, and U0 is merged with U1 and the transfer is restarted. The second abort algorithm is the algorithm for transferring update display frame U0 within the time left from original Tguar guarantee for U0. In other words, the update engine determines whether Tguar can be maintained for U0 if the current transfer is abandoned, and the transfer is restarted.

If both of the abort algorithms result in a higher quality compressed image than the continue algorithm, then the update engine (730) aborts the current transfer. For the purposes of this example, assume that the continue algorithm results in a higher quality algorithm than at least one of the abort algorithms. The updated engine (730), therefore, merges U1 into the transfer queue. Although the transfer queue is empty in the present example, any current queue items in the transfer queue that have already been transferred (i.e., LQTF is true) that overlap with U1 would be trimmed or eliminated.

In Step 766, the update engine (730) is notified that the transfer of U0 has completed. The update engine (730) must now determine which queue item to transfer next. The update engine (730) determines whether U0 was transferred using the highest quality algorithm, which it was not. The update engine (730) then sets the LQTF of U0 to true, and merges U0 into the transfer queue. The update engine (730) then determines that the queue is not empty (it includes both U0 and U1). The update engine (730) determines that at least one queue item has a LQTF equal to false, because U1 has not be transferred yet. The update engine then obtains the first algorithm by obtaining (i) the algorithm for all non-transferred items in the queue using a display frame target size of the current BW multiplied by Tguar (this ensures that all current items will satisfy Tguar "soft guarantee," unless new updates are received) and (ii) the algorithm for the first non-transferred item using a display frame target size of the current BW multiplied by the Tguar remaining for the first non-transferred item (this ensures that first item in queue will satisfy Tguar "soft guarantee"). If either of the queries is returned from the algorithm database as no algorithm (i.e., the algorithm to satisfy the query would have a lower quality then LQ algorithm), then the update engine (730) would merge all non-transferred items in the queue, and would then query the algorithm database using the resulting merged queue item, the current BW, and Tguar. In that case, the merged queue item would then be transferred across the network connection or communication channel using the resulting algorithm.

For the purposes of this example, assume that neither of the first algorithms is returned from the algorithm database as no algorithm. In Step 768, the update engine (730) initiates the transfer of U1 using the lower-quality first algorithm. In Step 770, the transmission of the compressed version of U1 across the network connection or communication channel is initiated. At Step 772, the frame receiving engine (712) on the tablet computer (702) receives the compressed version of U1. In Step 774, the compressed version of U1 is decoded and rendered as F1 by the tablet display (714).

Figure 8:
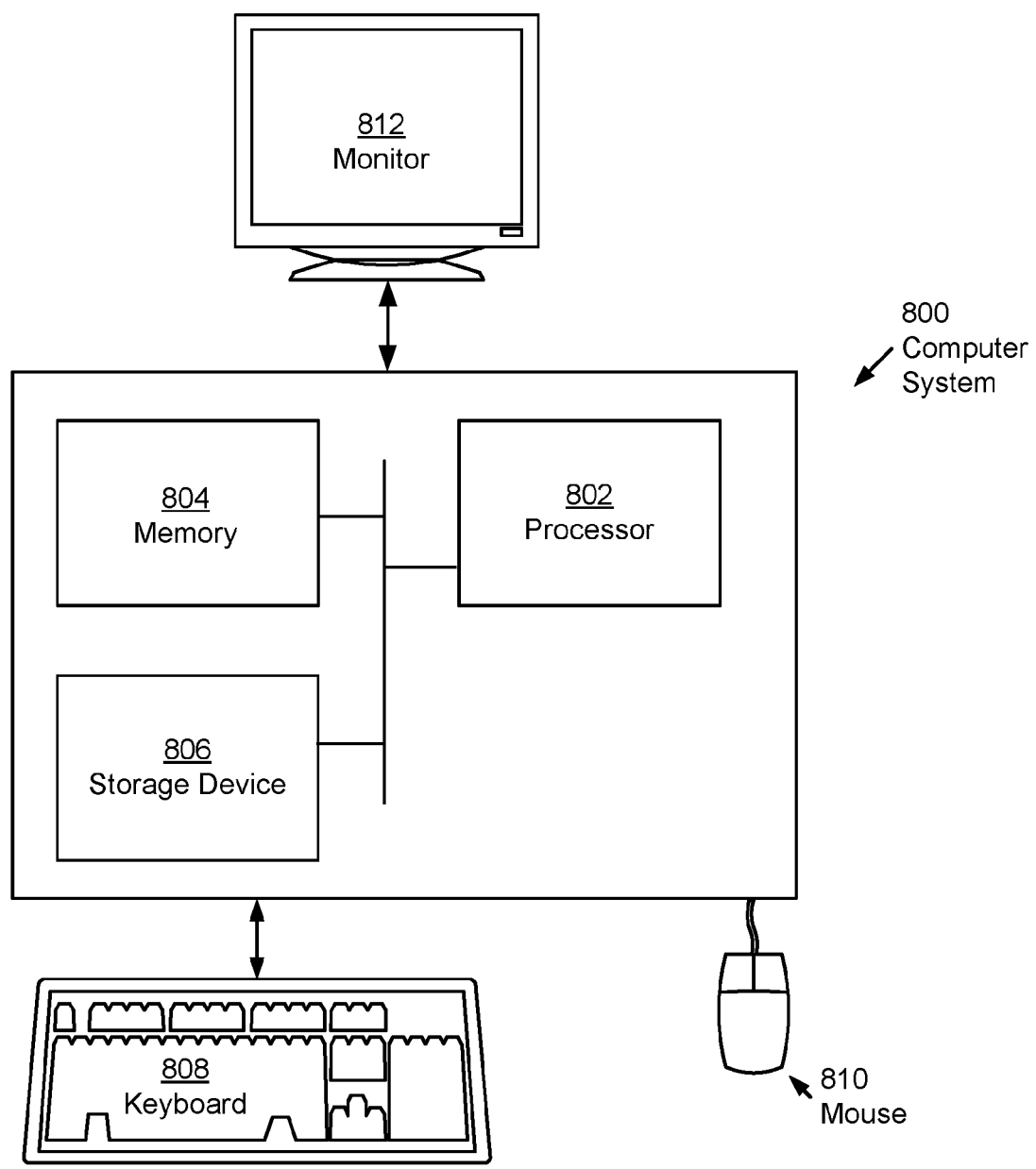
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802) such as a central processing unit (CPU) or other hardware processor(s), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for updating a remote display, comprising:
receiving a plurality of display frames of a source display;
storing, using a computer processor, at least some of the display frames in a queue;
selecting a first image compression algorithm from an algorithm database comprising a plurality of image compression algorithms, the plurality of image compression algorithms comprising a lowest quality (LQ) image compression algorithm and a highest quality (HQ) image compression algorithm;
performing, using the first image compression algorithm, a first transfer of a first display frame in the queue to the remote display over a network connection based on a first bandwidth of the network connection, a size of the first display frame, and sizes and times of display frames currently present in the queue,
determining that the first image compression algorithm is the LQ image compression algorithm;
determining that each display frame in the queue has been transferred to the remote display via an image compression algorithm of the plurality of image compression algorithms;
selecting the HQ image compression algorithm from the algorithm database; and
performing, using the HQ image compression algorithm, a second transfer of the first display frame to the remote display over the network connection based on a second bandwidth of the network connection, the size of the first display frame, and sizes and times of display frames currently present in the queue.

2. The method of claim 1, further comprising:
performing, using an HQ image compression algorithm, a third transfer of a second display frame in the queue to the remote display over the network connection based on a third bandwidth of the network connection, a size of the second display frame, and sizes and times of display frames currently present in the queue; and
removing the second display frame from the queue.

3. The method of claim 1, wherein the LQ image compression algorithm is a lossy compression algorithm, and the HQ image compression algorithm is a lossless compression algorithm.

4. The method of claim 1, further comprising:
determining that the transfer of the first display frame has completed; and
merging the first display frame into the queue.

5. The method of claim 1, further comprising:
determining that the second bandwidth is sufficient to transmit the first display frame using the HQ image compression algorithm,
wherein the HQ image compression algorithm is a lossless compression algorithm.

6. The method of claim 1, further comprising:
determining that the first display frame is an oldest display frame in the queue.

7. The method of claim 1, further comprising:
determining whether to abort a current transfer of a current display frame in the queue to the remote display.

8. A system for updating a remote display, comprising:
a source display, externally updatable;
an algorithm database comprising a plurality of image compression algorithms, the plurality of image compression algorithms comprising a lowest quality (LQ) image compression algorithm and a highest quality (HQ) image compression algorithm;
a network connection; and
a frame transfer engine executing on a computer processor and configured to:
receive a plurality of display frames of the source display;
store, using the computer processor, at least some of the display frames in a queue;
select a first image compression algorithm from the algorithm database;
perform, using the first image compression algorithm, a first transfer of a first display frame in the queue to the remote display over the network connection based on a first bandwidth of the network connection, a size of the first display frame, and sizes and times of display frames currently present in the queue,
determine that the first image compression algorithm is the LQ image compression algorithm;
determine that each display frame in the queue has been transferred to the remote display via an image compression algorithm of the plurality of image compression algorithms;
select the HQ image compression algorithm from the algorithm database; and
perform, using the HQ image compression algorithm, a second transfer of the first display frame to the remote display over the network connection based on a second bandwidth of the network connection, the size of the first display frame, and sizes and times of display frames currently present in the queue.

9. The system of claim 8, wherein the frame transfer engine is further configured to:
perform, using an HQ image compression algorithm, a third transfer of a second display frame in the queue to the remote display over the network connection based on a third bandwidth of the network connection, a size of the second display frame, and sizes and times of display frames currently present in the queue; and
remove the second display frame from the queue.

10. The system of claim 8, wherein the LQ image compression algorithm is a lossy compression algorithm, and the HQ image compression algorithm is a lossless compression algorithm.

11. The system of claim 8, wherein the frame transfer engine is further configured to:
determine that the transfer of the first display frame has completed; and
merge the first display frame into the queue.

12. The system of claim 8, wherein the frame transfer engine is further configured to:
determine that the second bandwidth is sufficient to transmit the first display frame using the HQ image compression algorithm, wherein the HQ image compression algorithm is a lossless compression algorithm.

13. The system of claim 8, wherein the frame transfer engine is further configured to:
   determine that the first display frame is an oldest display frame in the queue.

14. The system of claim 8, wherein the frame transfer engine is further configured to:
   determine whether to abort a current transfer of a current display frame in the queue to the remote display.

15. The method of claim 7, wherein determining whether to abort the current transfer comprises:
   determining whether a transfer of a third display frame in the queue will be completed within a pre-determined period of time relative to a timestamp indicating a time at which the third display frame was received.

16. The system of claim 14, wherein determining whether to abort the current transfer comprises:
   determining whether a transfer of a third display frame in the queue will be completed within a pre-determined period of time relative to a timestamp indicating a time at which the frame transfer engine received the third display frame.

* * * * *